(12) United States Patent  
Borkar et al.

(10) Patent No.: US 9,110,575 B2  
(45) Date of Patent: Aug. 18, 2015

(54) METHOD AND SYSTEM FOR GRAPHICALLY EMPHASIZING A PATH THROUGH A DIAGRAM

(75) Inventors: Aarti D Borkar, San Jose, CA (US); Arron J Harden, Olney (GB); Brian K Caufield, Livermore, CA (US)

(73) Assignee: International Business Machines Corporation, Armonk, NY (US)

( * ) Notice: Subject to any disclaimer, the term of this patent is extended or adjusted under 35 U.S.C. 154(b) by 964 days.

(21) Appl. No.: 12/251,332

(22) Filed: Oct. 14, 2008

(65) Prior Publication Data

US 2009/0271737 A1 Oct. 29, 2009

(30) Foreign Application Priority Data

Apr. 23, 2008 (EP) ..................................... 08155005

(51) Int. Cl.
*G06F 3/048* (2013.01)
*G06F 3/0484* (2013.01)

(52) U.S. Cl.
CPC .................................. *G06F 3/04845* (2013.01)

(58) Field of Classification Search
CPC ............. G06F 17/30; G06F 3/00; G06F 3/048
USPC .......... 715/821, 823, 824, 734, 738, 854, 855; 717/132, 155, 156
See application file for complete search history.

(56) References Cited

U.S. PATENT DOCUMENTS

| | | | | |
|---|---|---|---|---|
| 5,053,760 A * | 10/1991 | Frasier et al. | ................. | 345/473 |
| 5,481,741 A * | 1/1996 | McKaskle et al. | ............ | 345/522 |
| 5,596,502 A * | 1/1997 | Koski et al. | ..................... | 700/95 |
| 6,438,110 B1 * | 8/2002 | Rai et al. | ....................... | 370/254 |
| 6,959,431 B1 * | 10/2005 | Shiels et al. | .................. | 717/124 |
| 2004/0196310 A1 * | 10/2004 | Aamodt et al. | ............... | 345/738 |
| 2005/0171976 A1 * | 8/2005 | West et al. | ................. | 707/104.1 |
| 2005/0188332 A1 * | 8/2005 | Kolman | ........................ | 715/821 |
| 2006/0161855 A1 * | 7/2006 | Robertson et al. | ............ | 715/765 |
| 2008/0120121 A1 * | 5/2008 | Gilbert et al. | ..................... | 705/1 |
| 2008/0120153 A1 * | 5/2008 | Nonemacher et al. | ........... | 705/7 |
| 2009/0064053 A1 * | 3/2009 | Crawford et al. | ............. | 715/854 |
| 2009/0089115 A1 * | 4/2009 | Murthy | ........................... | 705/7 |
| 2009/0204900 A1 * | 8/2009 | Champion et al. | ............ | 715/738 |

* cited by examiner

*Primary Examiner* — Dino Kujundzic

(57) ABSTRACT

Methods and systems for graphically emphasizing a selected path through a diagram, where the diagram includes a number of nodes and a number of lines, the methods and systems including: applying a node highlight effect to a node of the number of nodes in the selected path, where applying the node highlight effect includes applying a node shadow to the node, applying a line highlight effect to a line of the number of lines in the selected path, where applying the line highlight effect includes applying a line shadow to the line, applying a node fade effect to a node of the number of nodes not in the selected path, and applying a line fade effect to a line of the number of lines not in the selected path.

18 Claims, 5 Drawing Sheets

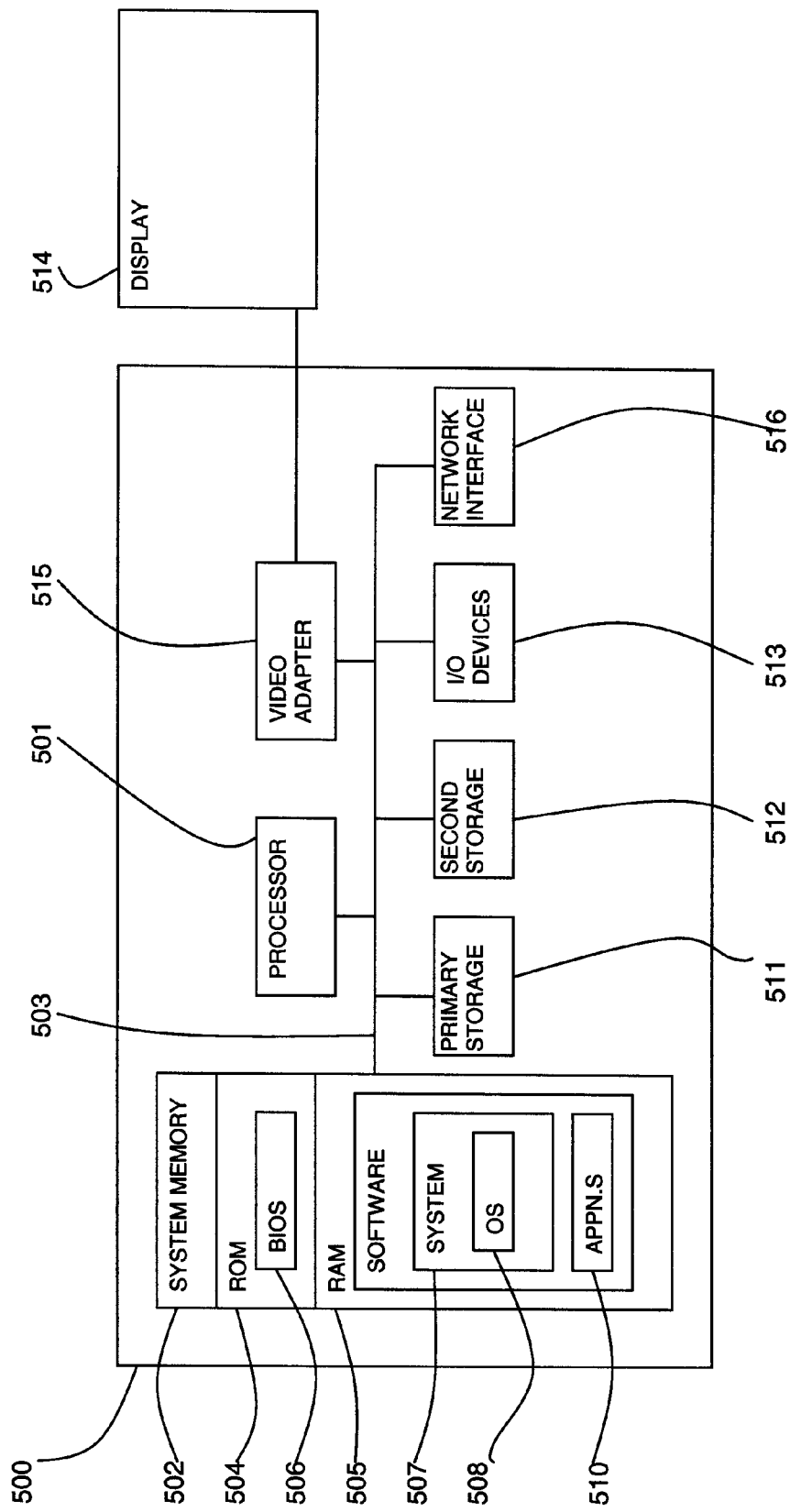

METHOD AND SYSTEM FOR GRAPHICALLY EMPHASIZING A PATH THROUGH A DIAGRAM

PRIORITY CLAIM TO FOREIGN APPLICATION

A claim for priority is hereby made under the provisions of 35 U.S.C. §119 for the present application based upon Great Britain Patent Application No. 08155005.5 filed on Apr. 23, 2008, which is incorporated herein by reference.

FIELD OF THE INVENTION

This invention relates to the field of graphical representation of a diagram. In particular, the invention relates to graphically emphasizing a path through a diagram such as a data flow diagram.

BACKGROUND

The problem is how to graphically emphasize a particular path or paths in a representation of a diagram such as a data flow diagram. A data flow diagram is a graphical representation of the flow of data through an information system. Data flow diagrams include stages or nodes connected by links or lines. A data flow diagram in a path design tool may include a path query which identifies a path through data stages. A problem is how to emphasize such a path through the diagram.

There are guidelines set by the United States Government under Section 508 of the Rehabilitation Act of 1973 regarding the accessibility of and use of information and data by Federal employees with disabilities. Section 508 also requires that individuals with disabilities, who are members of the public seeking information or services from a Federal agency, have access to and use of information and data.

Most of the specifications of the guidelines for software pertain to usability for people with vision impairments. For example, one provision requires alternative keyboard navigation, which is essential for people with vision impairments who cannot rely on pointing devices, such as a mouse. Other provisions address animated displays, color and contrast settings, flash rate, and electronic forms, among others.

One of the guidelines for software applications and operating systems is that "Color coding shall not be used as the only means of conveying information, indicating an action, prompting a response, or distinguishing a visual element" (Section 1194.21(i)).

The requirements of emphasizing a path in a diagram such as a data flow diagram can be summarised as the following:

i) An observer must be able to differentiate between the nodes not in the path from the nodes that are in the path;

ii) An observer must be able to read all information on nodes in the data flow diagram, whether emphasized or not, and iii) A colour must not by itself be used to convey information.

Current solutions for emphasizing a path through a data flow diagram include the following:

1) Colour all nodes in the path. This means point (ii) above fails since once coloured, the graphical information on a node cannot be read. Point (iii) is also not met and would fail Section 508 compliance.

2) Do not display any nodes that are not in the path, but this again fails point (ii).

3) Produce a textual report, but this looses the visual representation of the data flow diagram.

BRIEF SUMMARY

According to a first aspect of the invention, there is provided methods for graphically emphasizing a selected path through a diagram, where the diagram includes a number of nodes and a number of lines, the methods including: applying a node highlight effect to a node of the number of nodes in the selected path, where applying the node highlight effect includes applying a node shadow to the node, applying a line highlight effect to a line of the number of lines in the selected path, where applying the line highlight effect includes applying a line shadow to the line, applying a node fade effect to a node of the number of nodes not in the selected path, and applying a line fade effect to a line of the number of lines not in the selected path.

According to a second aspect of the invention, there is provided computer program products for graphically emphasizing a path through a diagram, where the diagram includes a number of nodes and a number of lines, the computer programs including: a computer readable medium, first program instructions for applying a node highlight effect to a node of the number of nodes in the selected path, where applying the node highlight effect includes applying a node shadow to the node, second program instructions for applying a line highlight effect to a line of the number of lines in the selected path, where applying the line highlight effect includes applying a line shadow to the line, third program instructions for applying a node fade effect to a node of the number of nodes not in the selected path, and fourth program instructions for applying a line fade effect to a line of the number of lines not in the selected path.

According to a third aspect of the invention, systems for graphically emphasizing a path through a diagram, where the diagram includes a number of nodes and a number of lines, the systems including a processor, the systems including: means for selecting a path through the diagram, means for applying a node highlight effect to a node of the number of nodes in the selected path, where applying the node highlight effect includes applying a node shadow to the node, means for applying a line highlight effect to a line of the number of lines in the selected path, where applying the line highlight effect includes applying a line shadow to the line, means for applying a node fade effect to a node of the number of nodes not in the selected path, and means for applying a line fade effect to a line of the number of lines not in the selected path.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIG. 5 is a block diagram of a computer system in which the present invention may be implemented.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The described method and system use the example of a diagram in the form of a data flow diagram; however, the method and system may be applied to any form of diagram through which a path may be emphasized.

A data flow diagram is used in many applications to illustrate the flow of data through an information system. A data flow diagram can also be used for the visualization of data processing or structured design. For example, in a path design tool, a path query identifies a path through data stages. The path through a data flow diagram needs to be identified on the graphical user interface.

For example, IBM WebSphere DataStage is an ETL (Extract, transform, load) tool which uses data flow diagrams (IBM, WebSphere, and DataStage are trade marks of International Business Machines Corporation). It uses a graphical notation to construct data integration solutions.

A path through a data flow diagram is used to graphically display the answer to a "What if?" question that a user of the DataStage designer may ask interactively. The user selects a source or target column that is part of the data flow job design, and asks "What if this column's definition were to change?". The answer requires the execution of complex queries against the metadata repository to determine where a column is used or referenced as it passes through the flow. Displaying the answer could be done textually, via a report, but is much easier to follow if presented graphically on a job design canvas, as the path of the column can then be visualized. A problem is how to emphasize the visualized flow on top of the existing job design diagram.

Figure 1:
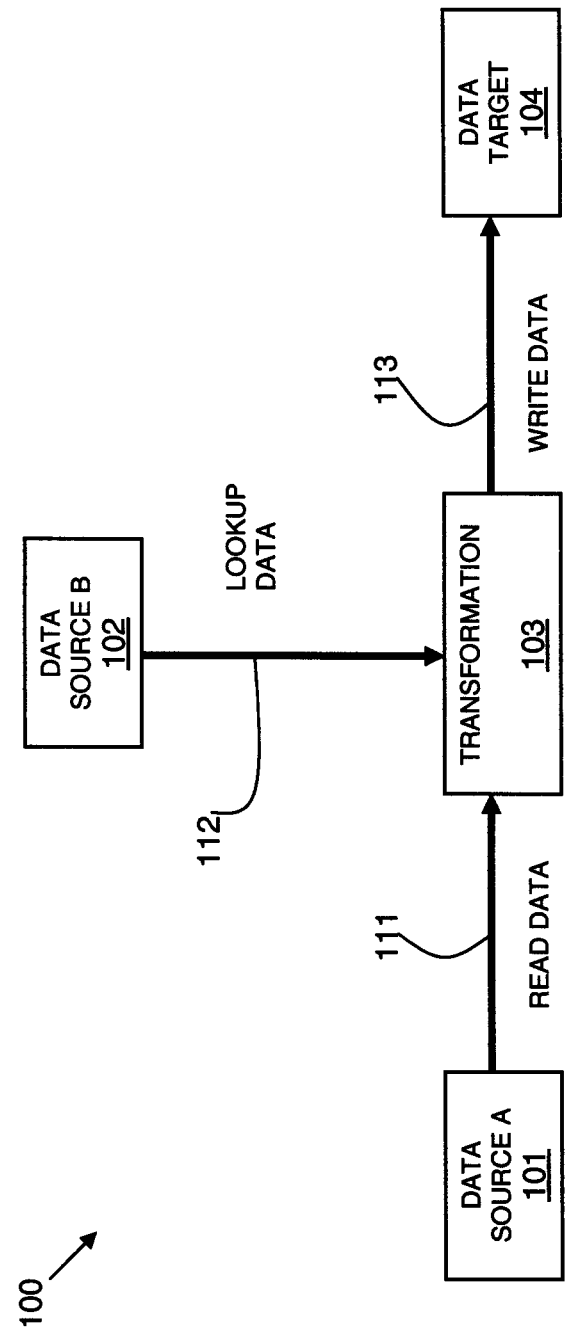
FIG. 1 is an example of a portion of a data flow diagram as known in the prior art.

FIG. 1 shows an example diagram. A diagram can include any number of nodes and lines in the flow. The bigger the diagram, with a higher number of nodes, the more complicated and difficult to read the diagram becomes. The clear emphasizing of a path through a large complicated diagram becomes even more valuable.

FIG. 1 shows a portion of a data flow diagram 100. The data flow diagram 100 has stages or nodes 101, 102, 103, 104 which represent a data source A 111, a data source B 102, a transformation 103, and a data target 104. The nodes 101-104 are connected by lines 111, 112, 113. The data source A 101 is connected by the named line "read data" 111 to the transformation 103. The data source B 102 is connected by the named line "lookup data" 112 to the transformation 103. The transformation 103 is connected to the data target 104 by the named line "write data" 113.

The described method emphasizes a path through a diagram by applying several graphical effects. Nodes and lines in a selected path are highlighted and nodes and lines that are not in the selected path are drawn faded out.

The highlighting of nodes is created by colouring or tinting a node and having a shadow drawn behind the node. Highlighting of lines is created by colouring or tinting a line and having a shadow drawn behind them. The colouring or tinting uses a user selectable colour/tint.

Lines between highlighted nodes may also have text drawn next to them, summarising why they are being highlighted.

It is a combination of all these graphical effects that meet the requirements (i) to (iii) listed above in the Background section.

Figure 2:
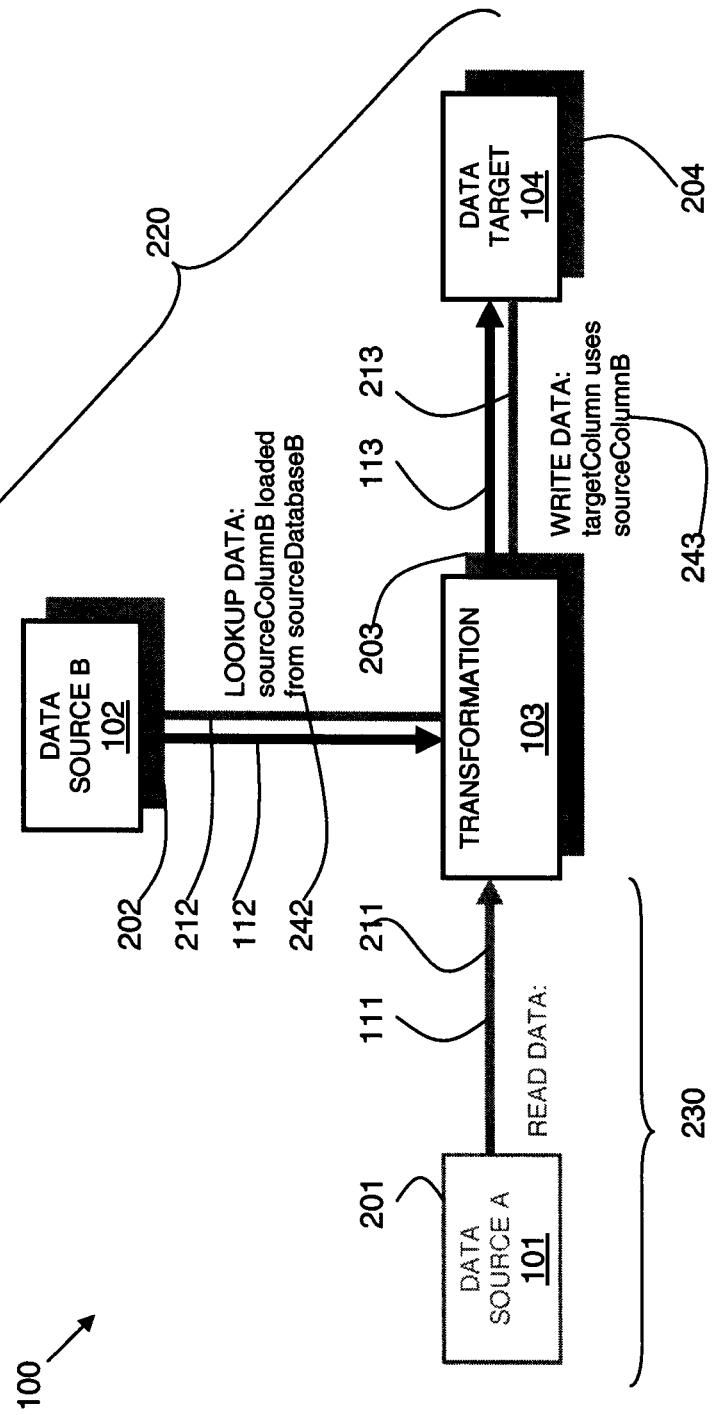
FIG. 2 is the portion of the data flow diagram of FIG. 1 with a path emphasized in accordance with the present invention.

FIG. 2 shows the portion of the diagram 100 of FIG. 1 emphasized using the effects described. The diagram is shown as a data flow diagram 100; however, other types of diagrams showing a flow may also have a path to be emphasized. For example, a work flow diagram or flow diagram for network architects. The described method of emphasizing may be applied to any diagram in which a path needs to be highlighted.

The data flow diagram 100 has a selected path 220 from node 102 of data source B to the transformation 103 and then to the data target 104 and the remaining paths are unselected 230. The nodes 102, 103, 104 are in the selected path 220. The line 112 between the data source B 102 and the transformation 103 and the line 113 between the transformation 103 and the data target 104 are also in the selected path 220. The node data source A 101 and the line 111 between the data source A 101 and the transformation 103 are unselected 230.

The nodes 102, 103, 104 and the lines 112, 113 of the selected path 220 are highlighted by tinting and by showing a shadow 202, 203, 204 of the nodes 102, 103, 104 and a shadow 212, 213 the lines 112, 113. The unselected elements 230 of the node 101 and line 111 are faded 201, 211.

In addition, the lines 112, 113 in the selected path 220 also have text 242, 243 drawn next to them, summarising why they are being highlighted.

When applying a tint effect there are two variables: tint colour and tint percent. When the tint percent is 0%, the output image is the same as the input and it is unchanged. When the tint percent is 100% all of the detail of the input image is lost and the output appears as a silhouette of just the solid tint colour. Every pixel of the input image (apart from the background) is set to be the tint colour.

When the tint percent is somewhere between 0-100%, for each colour in the original image it is biased to be 'closer' the tint colour. The amount of the bias is proportional to the tint percent. When a colour is represented as components of red, green and blue, this tinting effect can be expressed as a mathematical formula.

Applying a fade effect to a node or line applies a percentage transparency to the object. Any associated text can be faded by changing the colour to a lighter shade.

Figure 3:
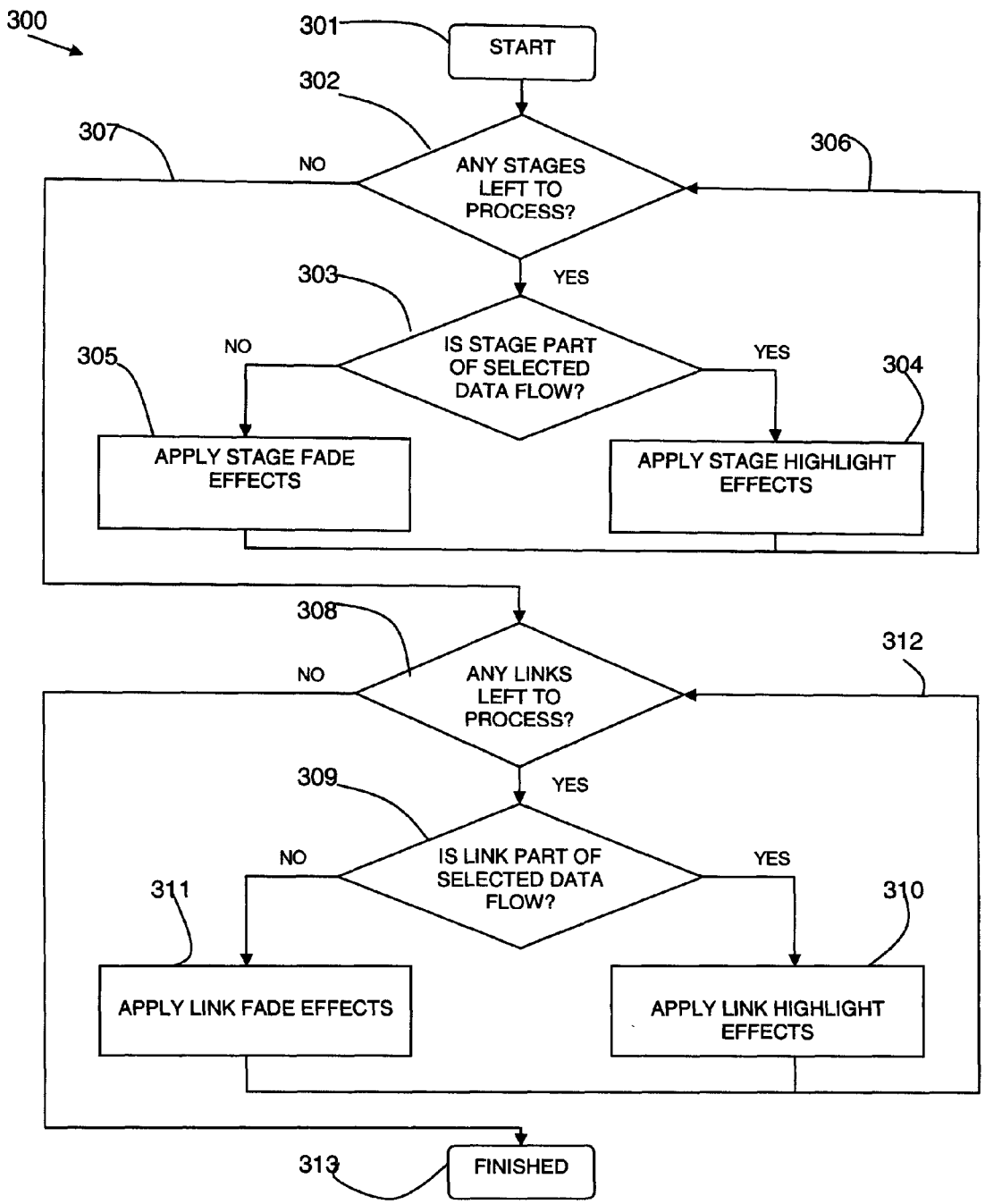
FIG. 3 is a flow diagram of a method in accordance with the present invention.

Referring to FIG. 3, a flow diagram 300 shows an embodiment of the process of modifying a data flow diagram to apply the described path emphasizing effects.

The process starts 301 and it is determined if there are any nodes to process 302. If there are nodes to process, it is determined if a node is part of a selected data flow 303. If the node is part of a selected data flow, the node highlight effects are applied 304. If the node is not part of a selected data flow, the node fade effects are applied 305. In both cases, the process then loops 306 to determine if there are any nodes to process 302. The process iterates until there are no more nodes to process at step 302 and the process proceeds 307.

The process proceeds 307 to determine if there are any lines to process 308. If there are lines to process, it is determined if a line is part of a selected data flow 309. If the line is part of a selected data flow, the line highlight effects are applied 310. If the line is not part of a selected data flow, the line fade effects are applied 311. In both cases, the process then loops 312 to determine if there are any further lines to process 308. The process iterates until there are no more lines to process at step 308 and the process finishes 313.

It should be understood that the order of processing the nodes and the lines in the process shown in FIG. 3 could be reversed, processing lines first and then nodes.

Applying node highlight effects includes:
1) Setting the node image tint amount to NODE_TINT_PERCENT percent of NODE_TINT_COLOUR; and
2) Setting the node image shadow size to NODE_SHADOW_SIZE.

Applying node fade effects includes:
1) Setting node image transparency percent to NODE_FADE_TRANSPARENCY; and
2) Setting node text colour to NODE_FADE_TEXT_COLOUR.

Applying line emphasize effects include the highlighting effects of:
1) Setting line colour to LINE_TINT_COLOUR;
2) Setting line shadow size of LINE_SHADOW_SIZE; and the additional emphasizing effect of:
3) Appending description to line text of how line is included in the data flow.

Applying line fade effects includes:
1) Setting line transparency to LINE_FADE_TRANSPARENCY; and
2) Setting line text colour to LINE_FADE_TEXT_COLOUR.

The tokens are listed below with optimum value ranges and acceptable value ranges.

TABLE 1

| Token | Optimum value range | Acceptable value range |
|---|---|---|
| NODE_FADE_TRANSPARENCY | 25% to 35% | 15% to 50% |
| LINE_FADE_TRANSPARENCY | 10% to 15% | 10% to 50% |
| NODE_TINT_PERCENT | 25% to 35% | 20% to 40% |
| NODE_SHADOW_SIZE | 2 to 3 pixels | 1 to 4 pixels |
| LINE_SHADOW_SIZE | 1 to 2 pixels | 1 to 3 pixels |
| NODE_FADE_TEXT_COLOUR | RGB 120, 120, 120 (light grey) | n/a |
| LINE_FADE_TEXT_COLOUR | RGB 120, 120, 120 (light grey) | n/a |
| NODE_TINT_COLOUR | RGB 255, 255, 0 (yellow) | n/a |
| LINE_TINT_COLOUR | RGB 255, 255, 0 (yellow) | n/a |

The optimum NODE_FADE_TRANSPARENCY values are more than the those for the line (LINE_FADE_TRANSPARENCY) because the node may have an image associated with it and therefore in order to ensure the image is still recognisable when faded, it must not be faded out too much.

When a line is highlighted, its colour is just changed to LINE_TINT_COLOUR. This effectively means the LINE_TINT_PERCENT is always 100%. The parameter LINE_TINT_PERCENT may be included with less than 100% if required.

An example may use the following parameters:
a faded line graphic of 11% of normal;
a faded line colour of RGB 120, 120, 120 (light grey);
a faded line text colour of RGB 120, 120, 120 (light grey);
a faded node of 27% of normal; and
a tinted node of 27% of selected tint colour.

The described method applies the graphical effects listed above when drawing the nodes and lines.

Figure 4:
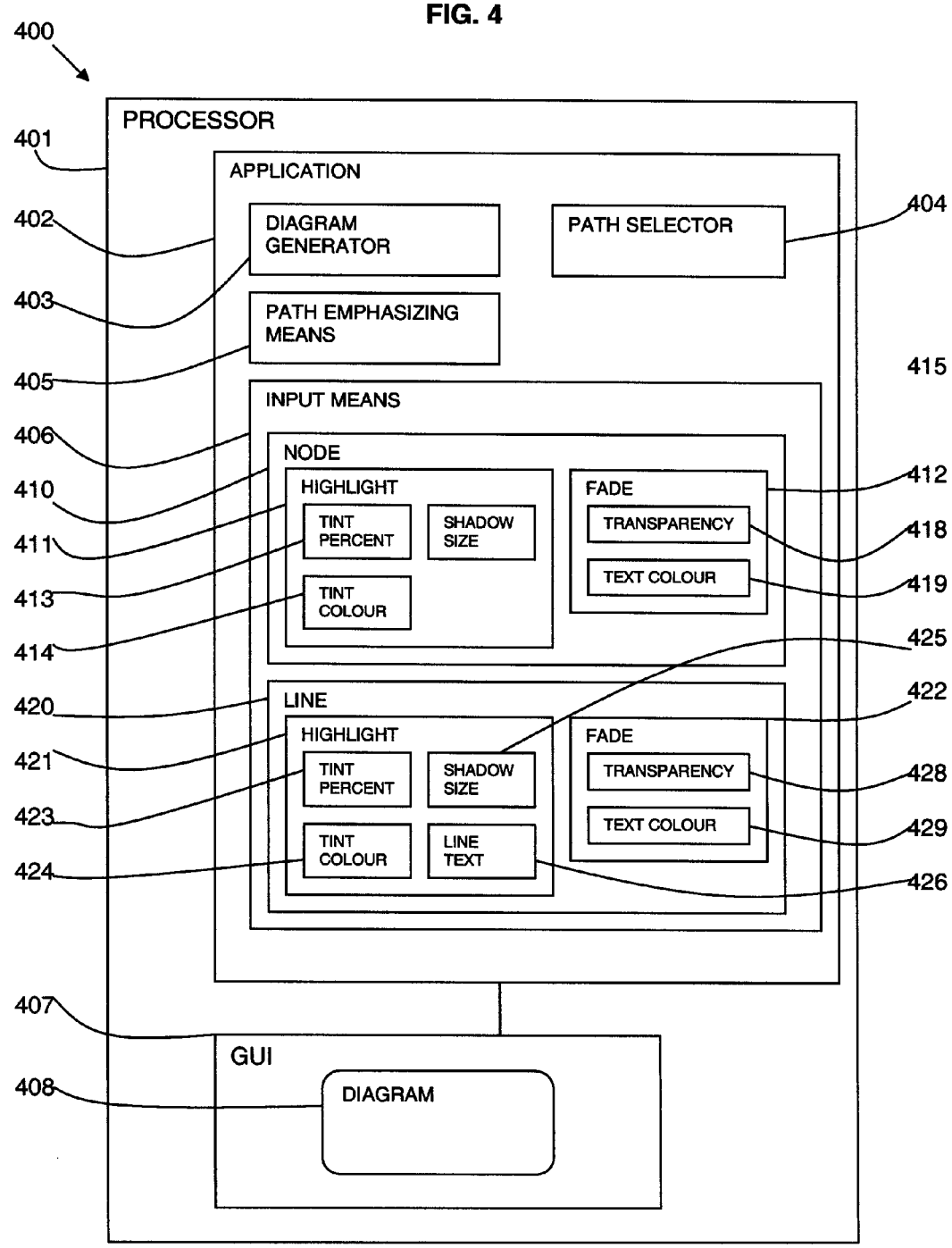
FIG. 4 is a block diagram of a system in accordance with the present invention.

Referring to FIG. 4, a block diagram shows a system 400 including a processor 401 on which an application 402 is executable. The application 402 may be one of many forms of application which include a diagram generator 403. For example, the application 402 may be a design tool including a diagram generator 403 to graphically represent a flow of data in a data flow diagram or workflow diagram. Another example, might be an application 402 used by network architects showing how servers are connected including a diagram generator 403.

The application 402 includes a path selector 404 for selecting a data flow path and a path emphasizing means 405 for emphasizing the nodes and lines in a path in the diagram generator 403.

The application 402 may also include input means 406 for a user to input emphasizing parameters.

In one embodiment, the input means 406 includes input means for parameters for a node 410 including highlighting parameters 411 and fade parameters 412.

For the highlighting parameters 411, the input means includes means for inputting tint percentage 413, tint colour 414, and shadow size 415.

The fade parameters 412 for a node include means for inputting the fade transparency 418 and fade text colour 419.

The input means 406 also includes input means for parameters for a line 420 including highlighting parameters 421 and fade parameters 422.

For the highlighting parameters 421, the input means includes means for inputting tint percentage 423, tint colour 424, and shadow size 425. In addition for a line, the highlighting parameters 421 include means for inputting text 426 adjacent a line.

The fade parameters 422 for a line include means for inputting the fade transparency 428 and fade text colour 429.

The application 402 is connected to a graphical user interface (GUI) 407 which displays a graphical representation of the diagram 408 of the diagram generator 403 including an emphasized path.

The path emphasizing means 405 applies the method described in FIG. 3 of emphasizing nodes and lines depending on whether or not the nodes and lines are in a selected path.

Referring to FIG. 5, an exemplary system for implementing the invention includes a data processing system 500 suitable for storing and/or executing program code including at least one processor 501 coupled directly or indirectly to memory elements through a bus system 503. The memory elements can include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. System software 507 may be stored in RAM 505 including operating system software 508. Software applications 510 may also be stored in RAM 505.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions, data structures, program modules and other data for the system 500. Software applications may be stored on the primary and secondary storage means 511, 512 as well as the system memory 502.

The computing system 500 may operate in a networked environment using logical connections to one or more remote computers via a network adapter 516.

Input/output devices 513 can be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention. While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for graphically emphasizing a selected path through a data flow diagram, wherein the data flow diagram includes a plurality of nodes and a plurality of lines, the method comprising:
    determining the selected path by a computer processor in response to a user query corresponding with a change to any of the plurality of nodes in the data flow diagram, wherein the selected path includes a visualized data flow through the data flow diagram, wherein the data flow diagram is a graphical representation of a flow of data through an information system, wherein the change corresponds with an execution of complex queries against a metadata repository, and wherein the path selected visually represents a result of the user query about the change to the data flow diagram;
    applying a node highlight effect to a first node of the plurality of nodes in the selected path, wherein applying the node highlight effect includes applying a node shadow to the first node;
    applying a line highlight effect to a first line of the plurality of lines in the selected path, wherein applying the line highlight effect includes applying a line shadow to the first line, wherein applying the line highlight effect further comprises appending a description to the first line, the description including a summary of why the first line is highlighted with respect to the user query and the change;
    applying a node fade effect to a second node of the plurality of nodes not in the selected path; and
    applying a line fade effect to a second line of the plurality of lines not in the selected path.

2. The method of claim 1, wherein applying the node highlight effect further includes tinting the first node, and wherein applying the line highlight effect further includes tinting the first line.

3. The method of claim 2, wherein
    tinting the node comprises;
        selecting a node colour for tinting the first node; and
        applying a percentage of tint for tinting the first node, and wherein
    tinting the line comprises:
        selecting a line colour for tinting the first line; and
        applying a percentage of tint for tinting the first line.

4. The method of claim 3, wherein
    applying the percentage of tint for tinting the first node includes applying a percentage in a range of 20%-40% of the node colour to the first node, and wherein
    applying a percentage of tint for tinting the first line includes applying a percentage in a range of 20%-40% of the line colour to the first line.

5. The method of claim 3, wherein the node colour and line colour includes yellow (RGB 255, 255, 0).

6. The method of claim 1, wherein applying a node fade effect includes applying a node image transparency percent to the second node, and wherein applying a line fade effect includes applying a line transparency percent to the second line.

7. The method of claim 1, wherein applying a node fade effect further includes applying a node text colour to the second node, and wherein applying a line fade effect further includes applying a line text colour the second line.

8. The method as claimed in claim 7, wherein the node text colour and the line text colour includes light grey (RGB 120, 120, 120).

9. The method of claim 1, wherein the node shadow is in a range of 1 to 4 pixels and the line shadow is in a range of 1 to 3 pixels.

10. The method of claim 1, wherein
applying a node fade effect includes fading the second node by a transparency of 15%-50% and wherein
applying a line fade effect fading the second line by a transparency of 10%-50%.

11. The method as claimed in claim 1, wherein a plurality of parameters corresponding with applying the node highlight effect, applying the line highlight effect, applying the node fade effect, and applying the line fade effect are user selectable.

12. A non-transitory computer readable medium storing a computer program product which when executed by a computer processor graphically emphasizes a selected path through a data flow diagram, wherein the data flow diagram includes a plurality of nodes and a plurality of lines, the computer program comprising:
a non-transitory computer readable medium;
in response to a user query corresponding with a change to any of the plurality of nodes in the data flow diagram, first program instructions for selecting the path, wherein the path includes a visualized flow through the data flow diagram, wherein the data flow diagram is a graphical representation of a flow of data through an information system, wherein the change corresponds with an execution of complex queries against a metadata repository, and wherein the path selected visually represents a result of the user query about the change to the data flow diagram;
second program instructions for applying a node highlight effect to a first node of the plurality of nodes in the selected path, wherein applying the node highlight effect includes applying a node shadow to the first node;
third program instructions for applying a line highlight effect to a first line of the plurality of lines in the selected path, wherein applying the line highlight effect includes applying a line shadow to the first line, wherein applying the line highlight effect further comprises appending a description to the first line, the description including a summary of why the first line is highlighted with respect to the user query and the change;
fourth program instructions for applying a node fade effect to a second node of the plurality of nodes not in the selected path; and
fifth program instructions for applying a line fade effect to a second line of the plurality of lines not in the selected path.

13. The computer program of claim 12, wherein the second program instructions for applying the node highlight effect further includes sixth program instructions for tinting the first node, and wherein the third program instructions for applying the line highlight effect further includes seventh program instructions for tinting the first line.

14. The computer program of claim 13, wherein
the sixth program instructions for tinting the first node comprises;
eighth program instructions for selecting a node colour for tinting the first node; and
ninth program instructions for applying a percentage of tint for tinting the first node, and wherein
the seventh program instructions for tinting the first line comprises:
tenth program instructions for selecting a line colour for tinting the first line; and
eleventh program instructions for applying a percentage of tint for tinting the first line.

15. The computer program of claim 12, wherein fourth program instructions for applying a node fade effect includes twelfth program instructions for applying a node image transparency percent to the second node, and wherein fifth program instructions for applying a line fade effect includes thirteenth program instructions for applying a line transparency percent to the second line.

16. A system for graphically emphasizing a path through a data flow diagram, wherein the data flow diagram includes a plurality of nodes and a plurality of lines, the system including a processor, the system comprising:
in response to a user query corresponding with a change to any of the plurality of nodes in the data flow diagram, means for selecting the path through the data flow diagram, wherein the path includes a visualized flow through the data flow diagram, wherein the data flow diagram is a graphical representation of a flow of data through an information system, wherein the change corresponds with an execution of complex queries against a metadata repository, and wherein the path selected visually represents a result of the user query about the change to the data flow diagram;
means for applying a node highlight effect to a first node of the plurality of nodes in the selected path;
means for applying a line highlight effect to a first line of the plurality of lines in the selected path, wherein means for applying the line highlight effect further comprises appending a description to the first line, the description including a summary of why the first line is highlighted with respect to the user query and the change;
means for applying a node fade effect to a second node of the plurality of nodes not in the selected path; and
means for applying a line fade effect to a second line of the plurality of lines not in the selected path.

17. The system of claim 16, further comprising:
means for appending a description to the first line, the description including a summary of why the first line is highlighted with respect to the user query.

18. The system of claim 16, further comprising:
user input means for selecting a plurality of parameters corresponding with applying the node highlight effect, applying the line highlight effect, applying the node fade effect, and applying the line fade effect.

* * * * *